March 6, 1956  O. F. GERRY  2,737,371
COMBINED BEATER EJECTOR AND SPEED CONTROL FOR FOOD MIXER
Filed July 13, 1954  2 Sheets-Sheet 1
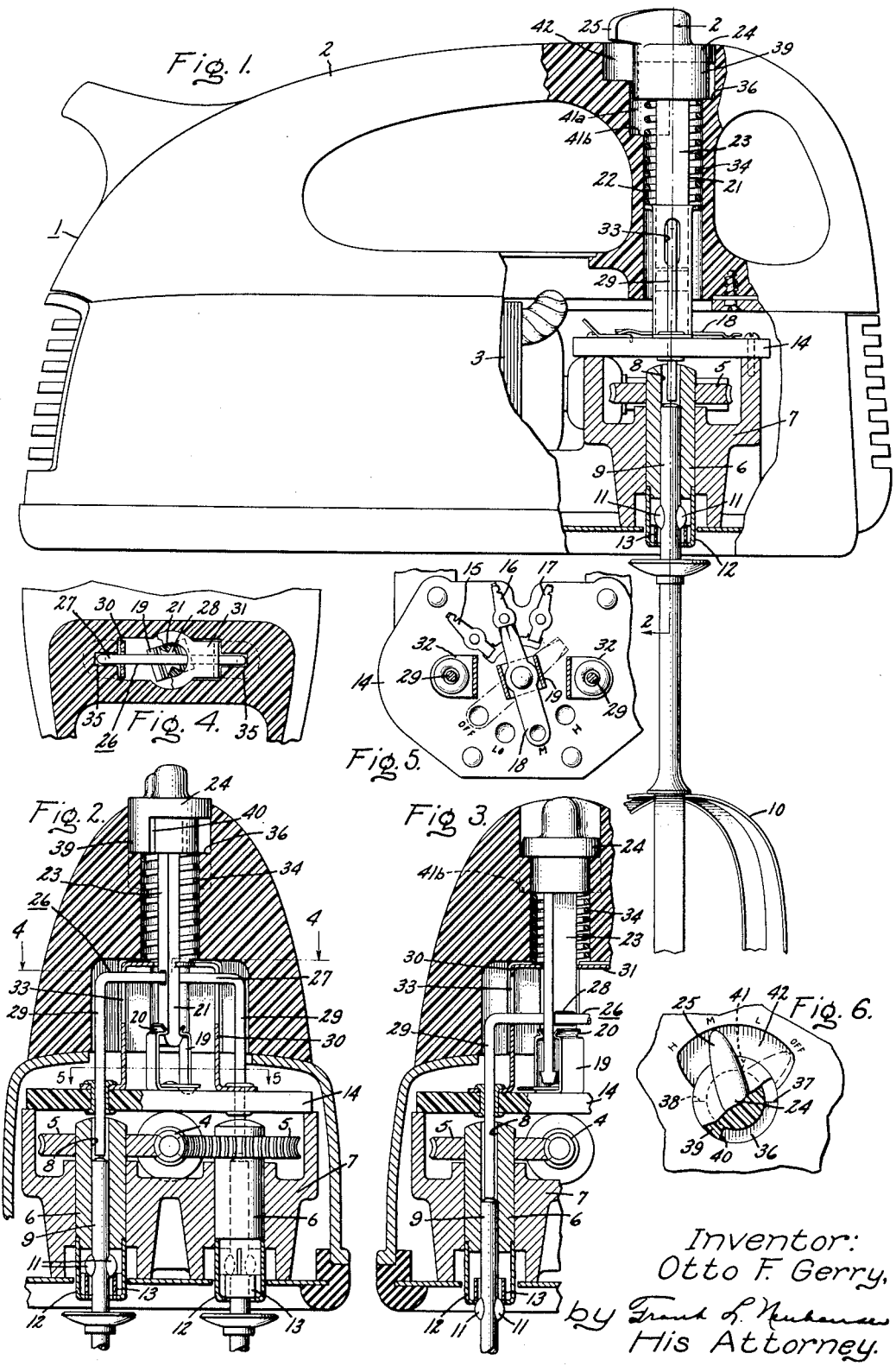
Inventor:
Otto F. Gerry,
by Frank L. Neuhauser
His Attorney.

March 6, 1956  O. F. GERRY  2,737,371
COMBINED BEATER EJECTOR AND SPEED CONTROL FOR FOOD MIXER
Filed July 13, 1954  2 Sheets-Sheet 2
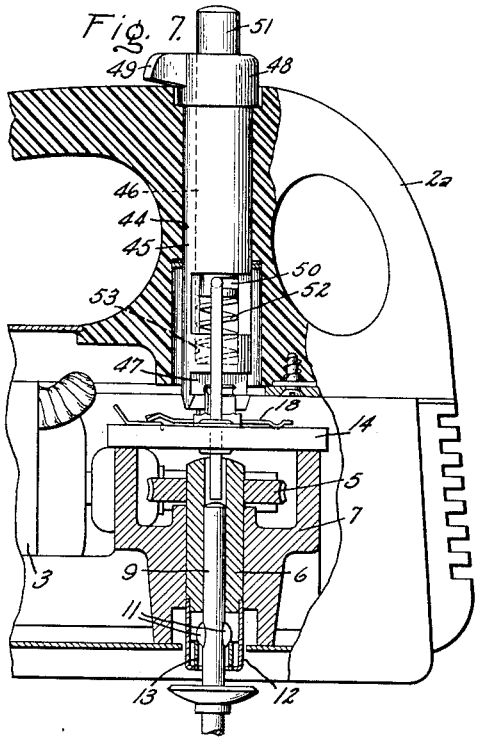
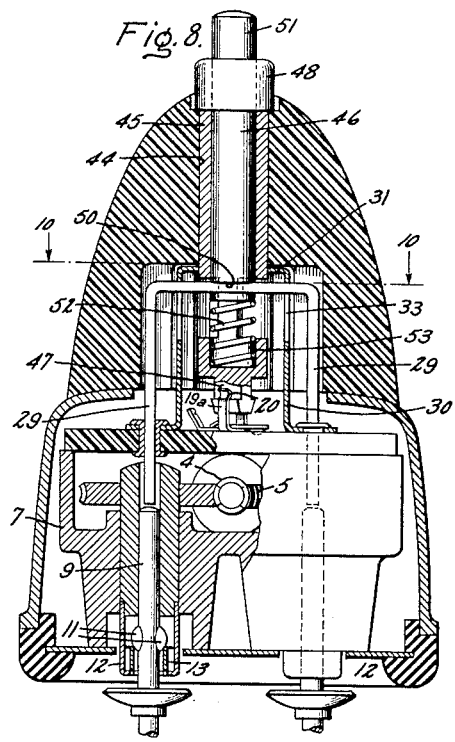
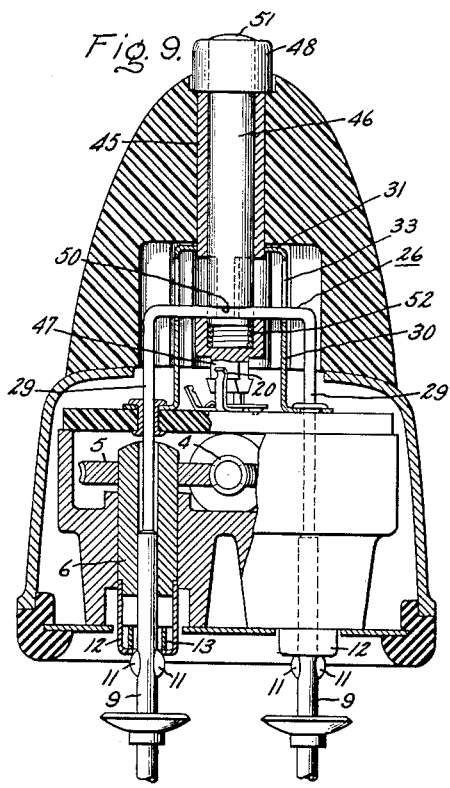
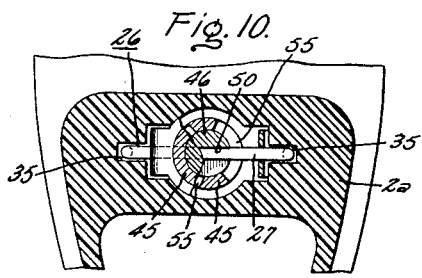
Inventor
Otto F. Gerry
by Frank L. Neuhauser
His Attorney

United States Patent Office 2,737,371
Patented Mar. 6, 1956

2,737,371

COMBINED BEATER EJECTOR AND SPEED CONTROL FOR FOOD MIXER

Otto F. Gerry, Brockport, N. Y., assignor to General Electric Company, a corporation of New York Application July 13, 1954, Serial No. 443,117

24 Claims. (Cl. 259—1)

My invention relates to food mixers and more particularly to beater ejector and speed control arrangements therefor.

In conventional kitchen food mixers, the beaters or other mixing tools are ordinarily carried on the ends of shafts which are driven through spindles from the mixer power unit. The connection between the spindles and the beater shafts is not a permanent one since it is desirable that the beaters be removed for cleaning and other purposes. It has been customary therefor to key the beaters to the spindles by means of radially extending keys on the beater shafts and cooperating axially extending keyways on the spindles. Such an arrangement prevents relative rotary motion between the beater shafts and the spindles but permits axial movement of the beater shafts relative to the spindles to provide for engagement and disengagement thereof.

In order to prevent the beaters from falling out of the spindles during use, resilient means are sometimes employed to lock the shafts in the mixing position. These resilient means require a relatively strong axial force to be applied to the shafts for either insertion or removal. It is advantageous to provide mechanical ejecting means for facilitating removal in order to allow the housewife to remove the food-covered beaters without getting the food on her hands.

Many food mixers also include a switch or other device for varying the speed of the mixer since different speeds are required for optimum results with different foods and mixing operations. In accordance with my invention the speed control and the beater ejector are combined into a unitary structure which is conveniently accessible and easily operated both for speed control and for beater ejection. It is, of course, undesirable that the beaters should be accidentally ejected while the beaters are being driven by the power unit. In accordance with my invention the control knob is so arranged that when it is in a position for permitting ejection of the beaters, the switch is necessarily in the off position.

It is an object of my invention to provide an improved arrangement for ejecting beaters from a food mixer.

It is another object of my invention to provide an improved beater ejector including a conveniently accessible and easily operated knob for actuating the beaters.

It is a further object of my invention to provide an improved combined speed control and beater ejector assembly.

It is still another object of my invention to provide an improved combined speed control and beater ejector which includes provision for preventing ejection of the beaters except when the speed control is in the off position.

Further objects and advantages of my invention will become apparent as the following description proceeds and the features of novelty which characterize my invention will be pointed out with particularity in the claims annexed to and forming part of this specification.

Carrying out the objects of my invention, a control knob is provided at the forward portion of the top of the handle of the mixer where it is conveniently accessible for actuation by the thumb or the forefinger of the user. The control knob is connected through an actuating shaft to a switch or other speed control mechanism so that rotation of the knob effects a change in the speed of the mixer. The knob is further connected through the actuating shaft to a yoke having its ends positioned in line with the beater shafts. When the knob is pressed downwardly the axial or longitudinal movement thereof presses the yoke against the upper ends of the beater shafts and effects ejection of the shafts. The knob includes a portion cooperating with the recess formed in the handle so that it may be moved downwardly for beater ejection only when it has been rotated to the off position.

For a better understanding of my invention, reference may be had to the accompanying drawing in which Fig. 1 is a side elevation view, partly in section, of a food mixer including an embodiment of my invention.

Fig. 2 is a transverse sectional elevation view taken generally along the line 2—2 in Fig. 1, showing the beater ejector in its inoperative position.

Fig. 3 is a view similar to Fig. 2 showing the beater ejector in its ejecting position.

Fig. 4 is a view taken along the line 4—4 in Fig. 2.

Fig. 5 is a view taken along the line 5—5 in Fig. 2.

Fig. 6 is a top plan view of a portion of a mixer showing a control knob partly broken away.

Fig. 7 is a side elevation view partly in section of a portion of a mixer illustrating a modified form of my invention.

Fig. 8 is a transverse sectional elevation view of the mixer of Fig. 7 taken generally along the line 8—8 in Fig. 7 and showing the ejector in its inoperative position.

Fig. 9 is a view similar to Fig. 8 showing the ejector in the process of effecting ejection of the beaters.

Fig. 10 is a sectional plan view taken along the line 10—10 in Fig. 8.

Referring to the drawing, there is shown in Fig. 1 a mixer 1 including a handle 2 for holding the mixer during use. The mixer includes a motor 3 which drives a worm 4. The worm 4 as best shown in Fig. 2 engages gears 5 rotating in opposite directions spindles 6 to which the gears 5 are fixed. The spindles 6 are journalled for rotation in a bearing block 7.

In order to effect operative driving relationship between the spindles and the beater shafts, the spindles each include an elongated recess or passage 8 into which the corresponding beater shaft 9 of the beater 10 is received. To prevent relative rotation between the spindle and its corresponding beater shaft, each beater shaft is formed to provide radially extending lugs or ears 11. A collar 12 is fixed to the lower end of each of the spindles. The lower end of each of the spindles 6 is provided with four radially extending slots, spaced in quadrature, for receiving the lugs or keys 11 to prevent relative rotation between the spindles and the beater shafts. A resilient ring 13 fits around the lower end of each spindle and is adapted to be spread by the keys 11 as the beater is inserted into the spindle. After the keys have passed beyond the ring 13 to the position shown in Figs. 1 and 2 the ring again contracts to prevent the beater from coming out of engagement with the spindle. The resilient means described above for retaining the beater shafts in proper operative engagement with the spindles is illustrated and described in detail in Patent 2,566,907 covering an invention of Alistair Robertson, assigned to the assignee of the present invention. Since the specific resilient means employed is not critical to the present invention, it is considered unnecessary to describe it in further detail.

Since different speeds are required for securing optimum results with different kinds of foods, an arrangement is provided for varying the speed of the mixer. In the form illustrated this speed control consists of a switch or switch member having three different speeds plus an off position. The switches may be connected into the circuit of the mixer in any suitable manner, for example, by cutting a suitable amount of resistance in series with the motor in the different operating positions. The switch mechanism is shown in Figs. 1, 2 and 3 and also in Fig. 5. As there illustrated, the mixer includes an insulating supporting block 14 upon which a plurality of stationary contacts 15, 16 and 17 are mounted. A rotatable switch blade 18 is arranged to make selective contact with each of the stationary contacts 15, 16 and 17 or to be shifted to the off position where this circuit is interrupted. The switch blade has fixed thereto an upstanding U-shaped clip or element 19 having inwardly extending legs 20 at the upper end. In order to effect movement of the clip 19 for shifting the switch from one position to the other to vary the speed of the mixer, an actuating shaft 21 is provided. The shaft 21 extends upwardly through a passage 22 in the front portion of the mixer handle. The shaft 21, as best illustrated in Fig. 2, has flat sides 23 in engagement with the legs 20 so that as the shaft is rotated the clip 19 is carried around therewith.

In order to facilitate the change in speed of the mixer through rotation of the shaft 21, a control knob 24 is fixed to the upper end of the shaft. The knob 24 includes a rearwardly extending tab 25 on the upper portion thereof which is adapted to be easily engaged by the thumb or forefinger for rotating the knob and hence the switch from one position to the other. To indicate the speed setting, indicia are provided on the top of the mixer handle. As shown in Fig. 6, for example, the indicia "H" (high), "M" (medium), "L" and "Off" may be marked on the handle or a suitable escutcheon plate secured thereto. The rearwardly extending tab 25 on the control knob 24 indicates, by its relationship to the indicia, the speed setting of the mixer.

In accordance with my invention there is combined with this structure an arrangement for ejecting the beaters so that axial or longitudinal movement of the knob may be employed for beater ejection. This structure includes a U-shaped yoke or ejector member 26. The yoke or ejector 26 includes a horizontal portion or leg 27 extending through an opening 28 in the actuating shaft 23 and downwardly extending legs 29 the lower ends of which are positioned in the passages 8 in the spindles 6 in alignment with the upper ends of the beater shafts 9. The horizontal portion 27 of the yoke also extends through two legs 30 of a bridge-type support member 31. This member 31 includes outwardly extending flanges 32 which are riveted or otherwise secured to the supporting plate 14 for mounting the bridge member. In order to accommodate the vertical motion of the yoke 26 for ejecting the beaters, the legs 30 of the bridge member are provided with elongated slots 33.

In order to bias the yoke into the upper or inoperative position shown in Figs. 1 and 2, a spring 34 is provided. The lower end of this spring bears against the bridge member 31 and the upper end engages the bottom of the control knob 24. This biases the yoke against the upper ends of the slots 33 in the bridge member in the inoperative position. It can be seen that ejection of the beaters with this arrangement can be easily effected by using the same knob 24 which is also used for controlling the speed setting. Thus to eject the beaters, it is merely necessary for the user to press downwardly on the control knob 24 shifting it against the bias of the spring 34, to the position shown in Fig. 3. This movement of the control knob carries with it, of course, the actuating shaft 21 and this in turn carries downwardly the yoke 26 which extends through the opening 28 in the actuating shaft. The lower ends of the legs 29 of the yoke, in being shifted to the position in Fig. 3, engage the upper ends of the beater shafts pressing them downwardly until the keys 11 pass through and beyond the aforementioned resilient rings 19. The beaters then drop freely from the mixer.

The U-shaped clip 19, through which rotation of the shaft 21 is transmitted to shift the speed control switch, as described above, permits downward movement of the actuating shaft during this ejection operation. By comparing Figs. 2 and 3 it can be seen that the actuating shaft 21 slides longitudinally downwardly relative to the clip 19, the legs 20 remaining in engagement with the flat sides 23 of the shaft during this operation. A similar relative movement takes place during the subsequent return of the actuating shaft and control knob to the position shown in Fig. 2 when pressure on the top of the control knob is released.

Thus by the arrangement described, the same knob 24, by rotational movement, effects rotation of the switch and hence change in the speed of the mixer and also by reciprocating or axial movement effects an ejection of the beaters from the mixer spindles.

In order to permit rotation of the actuating shaft 21 for changing the speed without shifting the yoke 26 from its position in alignment with the spindle passages 8 and the beater shafts 9, the actuating shaft opening 28 is flared outwardly at both sides thereof as indicated in Fig. 4. It can be seen from Fig. 4 that this flared shape of the opening 28 permits the limited rotational movement of the actuating shaft 21 without engagement of the shaft adjacent to opening 28 with the yoke 26 during such rotation. However, any vertical longitudinal movement of the actuating shaft 21 is transmitted immediately to the yoke 26 since the vertical dimension of the opening 28 is substantially the same as the diameter of the portion 27 of the yoke. In order to provide for free vertical movement of the yoke 26 for effecting ejection of the beaters, the molded plastic handle 2 is shaped to provide recesses 35 as shown in Fig. 4.

In accordance with my invention provision is made for preventing ejection of the beaters except when the switch is in the off position. The arrangement for accomplishing this is best shown in Fig. 6 and is also illustrated in Figs. 1, 2 and 3. Thus the molded plastic handle 2 adjacent the passage 22 is formed to provide a shoulder 36. This shoulder extends slightly less than 180 degrees from the point indicated by 37 to the point indicated by 38. Correspondingly, the control knob 24 is formed to include a portion 39 which, during operation of the mixer, that is when the switch is in the high, medium or low speed positions, rides at least in part on the shoulder 36. Referring to Fig. 6 this portion 39 of the control knob extends somewhat less than 180 degrees from the point indicated by 40 to the point indicated by 41. It can be seen that when the control knob 24 is in the position shown in Fig. 6, that is the medium speed position indicated by M, or in either the high or low positions shown in Fig. 6, the portion 39 thereof rides on the shoulder 36 thereby preventing the control knob from being pushed downwardly from the position shown in Fig. 2. Hence the beaters cannot be ejected when the mixer is in operation.

In order to eject the beaters from the mixer it is necessary to move the control knob 24 to the off position indicated by dotted lines in Fig. 6. As the control knob is moved clockwise as viewed in Fig. 6 to the off position, it can be seen that the edge 40 of the portion 39 of the knob passes beyond the edge 38 of the shoulder 36. Since, as mentioned previously, the shoulder 36 extends somewhat less than 180 degrees and the portion 39 of the knob also extends somewhat less than 180 degrees, the edge 40 clears the shoulder edge 38 before the other edge 41 of the knob portion 39 has reached the other edge 37 of the shoulder. The knob portion 39 then completely clears this shoulder permitting the knob 24 to be pushed downwardly to effect ejection of the beaters. Thus the ejection of the beaters can be readily effected by the downward movement of the knob when the switch is in the off position. During the downward movement of the knob for beater ejection the portion 39 thereof is received in a recess 41a in the handle, the downward movement of the knob being limited by engagement of the portion 39 with the ledge 41b at the bottom of this recess.

In order to permit downward movement of the tab 25 of the knob 24 the upper portion of the handle 2 is molded to provide a recess 42. As shown in Fig. 6 the recess 42 extends through a substantial arc encompassed by the full rotational movement of the control knob. However, this recess need be provided only in the region where the knob is in the off position since downward movement of the knob is permitted only in such region. In fact, the limitation of the downward movement of the knob to the off position thereof can be effected by making the recess 42 of a width only sufficient to accommodate the tab 25 in the off position. In such event the cooperating shoulder 36 and portion 39 may be omitted.

In Figs. 7 through 10 there is shown a modified form of my invention. This form differs from that previously described in that two concentric shafts are employed for the actuating mechanism, the outer shaft being rotatable to effect speed control and the other shaft being longitudinally or axially movable to effect ejection of the beaters. The same numerals have been used to designate corresponding parts in Figs. 1 through 6 and in Figs. 7 through 10. Referring to Figs. 7 through 10 there is shown a mixer including a slightly modified handle 2a of suitable molded plastic or other conventional material. In the forward portion thereof the handle 2a is provided with a vertical passage 44, corrsponding generally to the passage 22 in the form previously described, for accommodating the actuating shafts for speed control and beater ejection. In this form of my invention two concentric shafts are provided, one an outer tubular shaft 45 for effecting speed control and the other an inner cylindrical shaft 46 extending through the tubular shaft for effecting beater ejection.

A switch similar to that used in the form previously described is mounted on an insulated supporting plate 14. The switch blade 18 includes an upwardly extending U-shaped clip 19a, corresponding to the clip 19 of the form previously described, which is provided with inwardly extending portions 20. The inwardly extending legs 20 are adapted to engage the flat sides 47 of a depending portion arranged at the lower end of the generally tubular outer shaft 45 so that when this shaft is rotated, rotational movement of the switch blade 18 is effected in a manner corresponding to that previously described in connection with the form illustrated in Figs. 1 through 6. In order to effect rotational movement of the shaft 45 and of the switch, a knob 48 is fixed to or formed integral with the upper end of the shaft 45. This speed control knob 48 is provided with a rearwardly extending wing or tab 49 which may be easily engaged by the thumb or forefinger to effect rotation of the knob 48 to change the speed of the mixer. In this form of my invention only rotational movement of the knob 48 for changing the speed is contemplated. It will be noted therefore that the clip 19a is substantially shorter than the clip 19 of the previous form since relative axial movement of the lower end of the shaft 45 and of the clip 19a are not involved.

The inner shaft 46 is provided for effecting axial movement of the beater ejecting yoke 26. The yoke, which corresponds to that shown in Figs. 1-6, includes a horizontal leg 27 which extends through an opening 50 in the shaft 46. Th yoke further includes downwardly extending legs 29 which are adapted to engage the tops of the beater shafts 9 for ejection thereof.

The upper end of the shaft 46 is formed to provide an actuating button 51 which is depressed for ejection of the beaters. The shaft 46 and the button 51 are normally biased upwardly into the position shown in Figs. 7 and 8 by spring 52. The lower end of the spring 52 is received in a recess 53 formed at the bottom of the outer shaft 45. The upper end of the spring 52 bears against the bottom of the actuating shaft 46. The horizontal leg 26 of the yoke, in addition to being received in the opening 50 in the shaft 46 also extends through elongated openings 33 in the vertical legs 30 of the bridge member 31. As in the form previously described the yoke is received for vertical movement also within recesses 35 formed in the molded plastic handle 2a.

When it is desired to eject the beaters, a downward pressure is exerted, usually by the thumb, on the top of the button 51 moving the actuating shaft 46 vertically downwardly and compressing the spring 52. This movement of the shaft 46 also effects a corresponding downward movement of the yoke 26, ejecting the beaters as illustrated in Fig. 9. The downward movement of the yoke is limited by engagement of the horizontal leg 27 thereof with the bottom of the elongated slots 33 in the bridge member 31. When the pressure on the button 51 is released, the yoke is returned to its original position by the spring 52, the upward movement of the yoke being limited by engagement of the horizontal leg thereof with the upper end of the elongated slots 33.

In order to permit the necessary rotational movement of the outer tubular shaft 45 for effecting the aforementioned speed control, this shaft is provided in line with the path of movement of the yoke 26 with two opposite relatively wide openings 55. It can be seen by reference to Fig. 10 that the openings 55, extending through an arc of approximately 135 degrees, afford movement of the shaft 45 and the switch actuated thereby through a corresponding arc without interference with the yoke 26 whose horizontal upper leg 27 extends through these openings 55.

From the arrangement described, it can be seen that I have provided a device conveniently accessible at the upper forward portion of the handle of the mixer for easy actuation by either the thumb or forefinger for effecting both control of the speed of the mixer and ejection of the beaters therefrom.

While I have shown and described specific embodiments of my inveniton, I do not desire my invention to be limited to the particular constructions shown and described and I intend by the appended claims to cover all modifications within the spirit and scope of my invention.

What I claim as new and desire to secure by Letters Patent of the United States is:

1. A food mixer comprising a casing including a handle and an upright support for said handle at the forward portion of said mixer, a power unit in said casing including a driven spindle, a beater having a shaft received in said spindle, means for retaining said shaft and said spindle in operative driving relationship, an ejector for releasing said shaft from said retaining means, means for varying the speed of said mixer, said support including a passage therethrough opening at the top forward portion of the handle, and means positioned in said passage for actuating said ejector and said speed-varying means, said actuating means being accessible from above said handle for operation by the user at the top forward portion of said handle.

2. A food mixer comprising a casing including a handle and a support for said handle at the forward portion of said mixer, a power unit in said casing including a driven spindle, a beater having a shaft received in said spindle, means for retaining said shaft and said spindle in operative driving relationship, an ejector member for releasing said shaft from said retaining means, a second member for varying the speed of said mixer, said support including a passage therethrough opening at the top forward portion of the handle, and means positioned in said passage for actuating said ejector member and said second member, said means being accessible for operation by the user at the top forward portion of said handle, said means being rotatable to actuate one of said members and being movable axially to actuate the other of said members.

3. A food mixer comprising a casing including a handle grip portion and a handle support for said grip portion connected to the forward portion of said casing, a power unit in said casing including a driven spindle, a beater having a shaft received in said spindle, means for retaining said shaft and said spindle in operative driving relationship, an ejector for releasing said shaft from said retaining means, a switch for varying the speed of said power unit, said support including a passage therethrough opening at the top forward portion of the handle, and means positioned in said passage and extending above said handle grip portion for actuating said ejector and said switch, said means being accessible for operation by the user at the top forward portion of said handle.

4. The combination of claim 3 wherein said last-named means is rotatable to actuate said switch and movable axially to actuate said ejector.

5. A food mixer comprising a power unit including a driven spindle, a beater having a shaft received in said spindle, means for retaining said shaft in said spindle in operative driving relationship, an ejector for releasing said shaft from said retaining means, an actuator for said ejector, said actuator including a shaft arranged for both axial and rotational movement, and means for varying the speed of said mixer, said actuator shaft engaging said speed-varying means, said actuator shaft being rotatable for effecting movement of said speed-varying means to change the speed of said mixer and being axially movable for effecting movement of said ejector to eject said beater.

6. A food mixer comprising a power unit including a driven spindle, a beater having a shaft receivable in said spindle, means for retaining said shaft and said spindle in operative driving relationship, an ejector for releasing said shaft from said retaining means, an actuator for said ejector, said actuator including a shaft arranged for both axial and rotational movement, and a switch for controlling the speed of said power unit, said actuator shaft engaging said switch, said actuator shaft being rotatable for effecting movement of said switch to vary the speed of said mixer and being axially movable for effecting movement of said ejector to eject said beater.

7. A combination of claim 6 wherein a spring is provided for biasing said actuator shaft axially in a direction away from its beater-ejecting position.

8. A food mixer comprising a casing including a handle, a power unit in said casing including a driven spindle, a beater having a shaft received in said spindle, means for retaining said shaft and said spindle in operative driving relationship, an ejector for releasing said shaft from said retaining means, an actuator for said ejector, said actuator including a shaft arranged for both axial and rotational movement, a switch for controlling the speed of said power unit, said actuator shaft engaging said switch and said ejector, said actuator shaft being rotatable for effecting movement of said switch to vary the speed of said mixer and being axially movable for effecting movement of said ejector to eject said beater, a control knob fixed to one end of said shaft and accessible at the top forward portion of said handle, said knob being rotatable to effect rotation of said actuator shaft and being depressible to effect axial movement of said actuator shaft for ejection of said beater.

9. A food mixer comprising a casing including a handle and a support for said handle at the forward portion of said mixer, a power unit in said casing including a driven spindle, a beater having a shaft received in said spindle, means for retaining said shaft and said spindle in operative driving relationship, an ejector for releasing said shaft from said retaining means, a switch for varying the speed of said power unit, said support including a passage therethrough opening at the top forward portion of said handle, an actuating shaft positioned in said passage and mounted for both axial and rotational movement therein, said actuator shaft engaging said switch and said ejector, said actuator shaft being rotatable for varying the speed of said power unit and being axially movable for ejecting said beater, and a control knob fixed to the top end of said shaft and extending above the top of said handle at the forward portion thereof whereby said knob is easily accessible for rotation and for downward movement respectively to vary the speed of said power unit and to eject said beater.

10. A combination of claim 9 wherein a spring is provided for biasing said actuator shaft and said control knob to the upper position wherein said ejector is retained in a non-ejecting position.

11. A combination of claim 6 wherein means is provided for preventing axial movement of said actuator shaft except when said actuator shaft is rotationally so positioned that said switch is in its off position.

12. A combination of claim 9 wherein said passage is formed to include a shoulder therein and said control knob includes a portion engaging said shoulder for preventing downward movement thereof except when said control knob is so located rotationally that said switch is in its off position.

13. A food mixer comprising a casing including a handle and a support for said handle at the forward portion of said mixer, a power unit in said casing including a driven spindle, a beater having a shaft received in said spindle, means for retaining said shaft and said spindle in operative driving relationship, an ejector for releasing said shaft from said retaining means, a switch in said casing for varying the speed of said power unit, said switch including a rotatable switch arm, said support including a passage therethrough opening at the top forward portion of said handle, an actuating shaft positioned in said passage and mounted for both axial and rotational movement therein, said actuating shaft engaging said switch and said ejector, a clip mounted on said switch arm and having two spaced parallel upwardly extending legs, said actuating shaft being formed with two oppositely disposed flat sides, said legs of said clip engaging said flat sides whereby said switch arm is rotated for varying the speed of said power unit when said actuating shaft is rotated, said engagement of said legs of said clip with said flat sides of said actuator shaft affording relative axial movement of said shaft with respect to said clip, said actuating shaft being rotatable for varying the speed of said power unit and being axially movable for ejecting said beater, and a control knob fixed to the top end of said shaft and extending above the top of said handle at the forward portion thereof whereby said knob is easily accessible for rotation and for downward movement respectively to vary the speed of said power unit and to eject said beater.

14. A food mixer comprising a power unit including a pair of driven spindles, a pair of beaters each having a shaft receivable in one of said spindles, means for retaining each of said shafts and its corresponding driven spindle in operative driving relationship, a U-shaped yoke having a horizontal leg and two downwardly depending legs, each of said depending legs being in line with and adapted to engage a corresponding one of said beater shafts for releasing said beater shafts from said retaining means, a vertical actuating shaft mounted for rotational and axial movement, said actuating shaft having a horizontal opening therein for receiving said horizontal leg of said yoke, a rotatable switch for controlling the speed of said power unit, means connecting said actuating shaft to said switch for rotation thereof but affording axial movement of said actuating shaft relative to said switch, a control knob fixed to the upper end of said actuating shaft and arranged for both axial and rotational movement, and a spring engaging said knob for biasing said actuating shaft and yoke upwardly, said knob being rotatable to actuate said switch for varying the speed of said power unit, said knob being movable downwardly against the bias of said spring for moving said yoke into engagement with said beater shafts to eject said beaters, said relative axial movement of said actuating shaft and said switch affording movement for ejection of said beaters without affecting said switch.

15. A food mixer comprising a casing including a handle and a support for said handle at the forward portion of said mixer, a power unit in said casing including a pair of driven spindles, a pair of beaters each having a shaft receivable in one of said spindles, means for retaining said shaft in its corresponding driven spindle in operative driving relationship, a U-shaped yoke having a horizontal leg and two downwardly depending legs, each of said depending legs being in line with and adapted to engage a corresponding one of said beater shafts for releasing said beater shafts from said retaining means, a rotatable switch for controlling the speed of said power unit, said support including a vertical passage therethrough opening at the top forward portion of said handle, a vertical actuating shaft positioned in said passage and mounted for both axial and rotational movement therein, said actuating shaft having a horizontal opening therein for receiving said horizontal leg of said yoke, means connecting said actuating shaft to said switch for rotation thereof but affording axial movement of said actuating shaft relative to said switch, a control knob fixed to the upper end of said actuating shaft and arranged for both axial and rotational movement, and a spring engaging said knob for biasing said actuating shaft and said yoke upwardly, said knob being rotatable to actuate said switch for varying the speed of said power unit, said knob being movable downwardly against the bias of said spring for moving said yoke into engagement with said beater shafts to eject said beaters, said relative axial movement of said actuating shaft and said switch affording movement for ejection of said beaters without affecting said switch, said vertical passage being formed to provide a shoulder therein, said control knob including a portion engaging said shoulder for preventing downward movement thereof except when said control knob is so located rotationally that said switch is in its off position.

16. The combination of claim 14 wherein said horizontal opening in said actuating shaft is flared at both ends thereof to permit relative movement of said actuating shaft and said horizontal leg of said yoke during rotational movement of said actuating shaft for actuating said switch.

17. The combination of claim 14 wherein a horizontal supporting plate is mounted in said casing, said switch is mounted on said plate, a U-shaped bridge member is mounted on said plate with the two vertical legs of said bridge member being generally parallel to the depending legs of said yoke, said vertical legs of said bridge member each including a slot through which said horizontal leg of said yoke extends, and wherein said horizontal leg of said yoke engages the ends of said slots to limit travel of said yoke in the upper and lower positions thereof.

18. A food mixer comprising a power unit including a driven spindle, a beater having a shaft receivable in said spindle, means for maintaining said shaft and said spindle in operative driving relationship, an ejector member for releasing said beater shaft from said retaining means, a second member for varying the speed of said mixer, and two concentric shafts, one of said concentric shafts engaging said ejector member and the other of said concentric shafts engaging said second member, one of said concentric shafts being rotatable to actuate one of said members and the other of said concentric shafts being axially movable for actuating the other of said members.

19. A food mixer comprising a power unit including a driven spindle, a beater having a shaft receivable in said spindle, means for retaining said shaft and said spindle in operative driving relationship, an ejector for releasing said beater shaft from said retaining means, means for varying the speed of said mixer, and two concentric shafts, one of said concentric shafts engaging said ejector and being axially movable for actuating said ejector, the other of said concentric shafts engaging said speed-varying means and being rotatable for moving said speed-varying means to vary the speed of said mixer.

20. A food mixer comprising a power unit including a driven spindle, a beater having a shaft receivable in said spindle, means for retaining said shaft and said spindle in operative driving relationship, an ejector for releasing said beater shaft from said retaining means, a switch for varying the speed of said power unit, and two concentric shafts, one of said concentric shafts engaging said ejector and being axially movable for actuating said ejector, the other of said concentric shafts engaging said switch and being rotatable for moving said switch.

21. A food mixer comprising a power unit including a driven spindle, a beater having a shaft receivable in said spindle, means for retaining said shaft and said spindle in operative driving relationship, an ejector for releasing said shaft from said retaining means, an actuator for said ejector, said actuator including an axially movable shaft, a switch for varying the speed of said power unit, and a tubular shaft concentric with said actuator shaft engaging said switch, said tubular shaft being mounted for rotational movement to move said switch.

22. A combination of claim 21 wherein a knob is fixed to said tubular shaft and wherein said actuator shaft includes a button projecting above said knob and depressible for ejection of said beater.

23. A combination of claim 22 wherein a spring is provided for engaging said actuator shaft to bias said actuator shaft to a position wherein said button projects above the top of said knob.

24. A food mixer comprising a casing including a handle and a support for said handle at the forward portion of said mixer, a power unit in said casing including a driven spindle, a beater having a shaft received in said spindle, means for retaining said shaft and said spindle in operative driving relationship, an ejector for releasing said shaft from said retaining means, a switch for varying the speed of said power unit, said support including a passage therethrough opening at the top forward portion of said handle, an actuating shaft positioned in said passage and axially movable for actuating said ejectors to release said ejector, a tubular shaft in said passage concentric with said actuating shaft and engaging said switch, said tubular shaft being mounted for rotational movement to move said switch, and a knob fixed to the top end of said tubular shaft and extending above the top of said handle at the forward portion thereof whereby said knob is easily accessible for rotation of said tubular shaft to vary the speed of said power unit, said actuator shaft including a button projecting above said knob and depressible for ejection of said beater.

References Cited in the file of this patent

UNITED STATES PATENTS

| | | |
|---|---|---|
| 2,615,942 | Edman | Oct. 28, 1952 |
| 2,616,732 | Schwaneke | Nov. 4, 1952 |